United States Patent
Favreau et al.

(10) Patent No.: US 9,040,148 B2
(45) Date of Patent: May 26, 2015

(54) METHOD FOR OBTAINING A PART MADE OF A COMPOSITE FOR THE PURPOSE OF LIMITING THE EDGE EFFECTS

(75) Inventors: Freddy Favreau, Reze (FR); Denis Brossard, Saint Aignan de Grand Lieu (FR)

(73) Assignee: Airbus Operations (S.A.S.), Toulouse (FR)

( * ) Notice: Subject to any disclaimer, the term of this patent is extended or adjusted under 35 U.S.C. 154(b) by 895 days.

(21) Appl. No.: 13/067,806

(22) Filed: Jun. 28, 2011

(65) Prior Publication Data

US 2011/0318540 A1 Dec. 29, 2011

(30) Foreign Application Priority Data

Jun. 28, 2010 (FR) ...................... 10 55151

(51) Int. Cl.
*B32B 3/00* (2006.01)
*B32B 23/02* (2006.01)
*B29C 70/54* (2006.01)
*B29C 70/30* (2006.01)

(52) U.S. Cl.
CPC ............. *B29C 70/545* (2013.01); *B29C 70/30* (2013.01)

(58) Field of Classification Search
CPC ...... B32B 18/00; B32B 5/26; B32B 2250/20; B32B 2260/023; B32B 38/185; B32B 38/0004; B32B 3/00; B32B 3/02; B32B 23/02; C08J 5/24; C03C 14/002; C03C 2214/02; C03C 2214/20; C03C 2214/30
USPC ............... 428/77, 78, 79, 114, 156, 172, 189, 428/192, 902; 264/257, 258; 156/267, 268, 156/270, 244.18, 244.19, 250
See application file for complete search history.

(56) References Cited

U.S. PATENT DOCUMENTS 3,765,996 A * 10/1973 Munyon ........................ 428/78
6,311,542 B1 * 11/2001 Sloman ........................ 73/12.13

FOREIGN PATENT DOCUMENTS

| DE | 87 05 211 | 9/1987 |
| DE | 40 36 803 | 5/1992 |
| FR | 2 905 891 | 3/2008 |

OTHER PUBLICATIONS

Search Report for FR 1055151 dated Feb. 14, 2011.
Non-English Written Opinion for FR 1055151 dated Feb. 14, 2011.

* cited by examiner

*Primary Examiner* — Catherine A Simone
(74) *Attorney, Agent, or Firm* — Nixon & Vanderhye P.C.

(57) ABSTRACT

The invention relates to method for obtaining a part made of a composite of fibers embedded in a resin matrix which comprises a body and an edge. The method comprises a first step of stacking plies of fibers and further comprises a step of curing the plies. The method further comprises prior to the curing step, the step of covering the edge with at least one additional ply, in order to compensate for the migration of the resin during curing.

7 Claims, 3 Drawing Sheets

METHOD FOR OBTAINING A PART MADE OF A COMPOSITE FOR THE PURPOSE OF LIMITING THE EDGE EFFECTS

FIELD OF THE INVENTION

The present invention relates to a method for obtaining a part made of a composite, more precisely a part made from plies of prepreg fibres for the purpose of limiting the edge effects. A part made of a composite comprises fibres embedded in a resin matrix.

TECHNICAL BACKGROUND

According to a known embodiment, a part made of a composite can be made from plies of prepreg resin fibres. In a first phase called lay-up, the fibre plies are placed in a mould comprising, on the one hand, a plate for shaping the surface of the part at its contact and, on the other hand, peripheral side pads which shape the sides of the part. After a curing phase for consolidating the part by subjecting it to a temperature and pressure cycle, the part is ejected, and then inspected before being machined to the final dimensions.

During curing, the resin tends to migrate away from the periphery of the part, so that the height of the part tends to decrease from the middle towards the sides thereof. This phenomenom, called the edge effect, gives rise to the production, after curing, of a part 10 as shown in FIG. 1.

This part, presumed to have a rectangular cross section with the final dimensions, comprises, after curing, a rectangular central portion 12 with, at the periphery, edges with a face 14 inclined to the central portion, so that the sides of the part have a lower height than that of the central portion. Thus, the part obtained after curing comprises peripheral zones 16 having a trapezoidal cross section having a width X that may vary according to the thickness of the part and the materials.

In a first operating procedure, insofar as the part obtained after curing must be machined to the final dimensions, it is possible to take account of the edge effect and to increase the dimensions of the blank so that the width A is smaller than the width X of the zones to be removed at the edges, as shown in FIG. 2. However, this operating procedure is unsatisfactory because it requires increasing the quantity of material used and, more particularly, the quantity of machined material, thereby tending to increase the raw material costs and the production costs, due to the longer lay-up time. Furthermore, it is necessary to modify the tools in order to increase their useful surface areas, in order to maintain a machining time that is substantially equivalent to the time for machining a blank whose dimensions do not take account of the edge effect.

Finally, this operating procedure is contrary to developments in manufacturing processes, which are designed to obtain a blank whose dimensions are as close as possible to those of the finished part.

In another operating procedure shown in FIG. 3, a blank is made whose dimensions do not take account of the edge effect but are close to those of the finished part. After curing and machining, the edges of the finished part are observed to have inclined faces 14. To correct this geometric and/or dimensional defect, at least one additional ply 18 is added at the edge in order to increase the thickness.

In this operating procedure, the method comprises a first lay-up phase, a first curing phase, a first inspection phase, a machining phase, followed by a second lay-up phase in order to deposit the additional plies, a second curing phase for curing the said additional plies in order to consolidate them and to bind them to the rest of the part, followed by a new inspection phase generally associated with a waiver operating procedure.

This operating procedure is not fully satisfactory because it necessarily impacts the part insofar as it undergoes two curing phases. Furthermore, it leads to longer cycle times due to the two curing and inspection phases and to derogation procedures. Thus, in this operating procedure, even if the edge effects can be limited at the geometric and dimensional level, they necessarily influence the structure of the part obtained and on the production cycle times.

Thus, the present invention proposes a method for obtaining a part made of a composite which tends to limit the edge effects at the structural level of the part, while obtaining, after curing, a blank whose dimensions are close to those of the finished part.

SUMMARY OF THE INVENTION

According to a first aspect of the invention there is provided a method for obtaining a part made of a composite of fibres embedded in a resin matrix which comprises a portion called a body and a portion called an edge, the method comprising a first step of stacking plies of fibres and a second step of curing the plies, characterized in that, prior to the curing step, the method further comprises the step of covering the edge with at least one additional ply, in order to compensate for the migration of the resin during curing.

This arrangement serves to limit the edge effects at the structural level insofar as the additional ply (plies) is (are) cured at the same time as the other plies of the part.

Advantageously, the method serves to obtain, after Curing, a blank having at least one dimension that is slightly larger than that of the part to be obtained and comprises, after the curing step, a step consisting in removing at least one zone at the edge in order to obtain a finished part. In this case, the method is characterized in that the said at least one additional ply is placed on the surface of the zone to be removed and has a width smaller than the width of the said zone to be removed.

This arrangement serves to reduce the impact of the addition of the additional plies at the geometric and dimensional level of the finished part, insofar as the said plies form part of the zone to be removed and are not present on the finished part.

BRIEF DESCRIPTION OF THE DRAWINGS

Other features and advantages will appear from the description of the invention that follows, given exclusively as an example, in conjunction with the appended figures in which.

DETAILED DESCRIPTION

Figure 1:
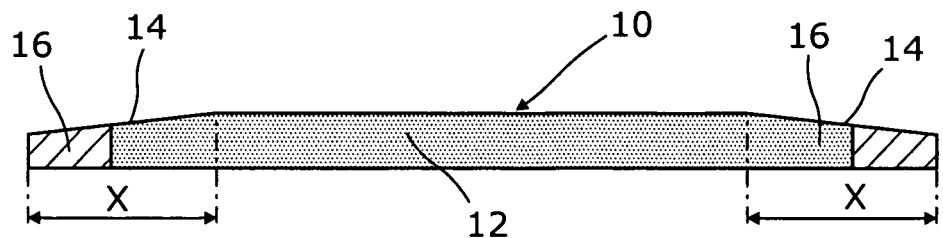
FIG. 1 shows a cross section of a part after curing showing the edge effects of the prior art.
Figure 2:
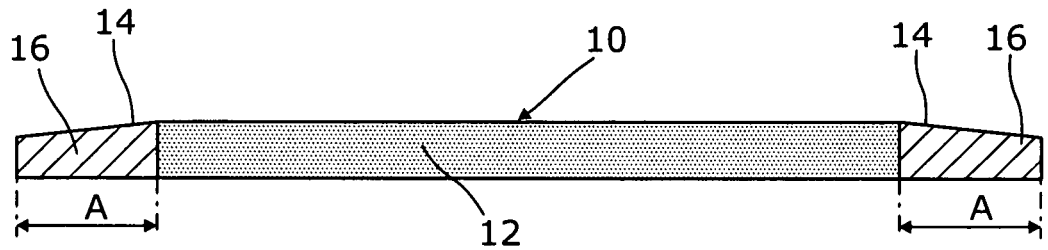
FIG. 2 shows a cross section of a part after curing, showing a first operating procedure of the prior art.
Figure 3:
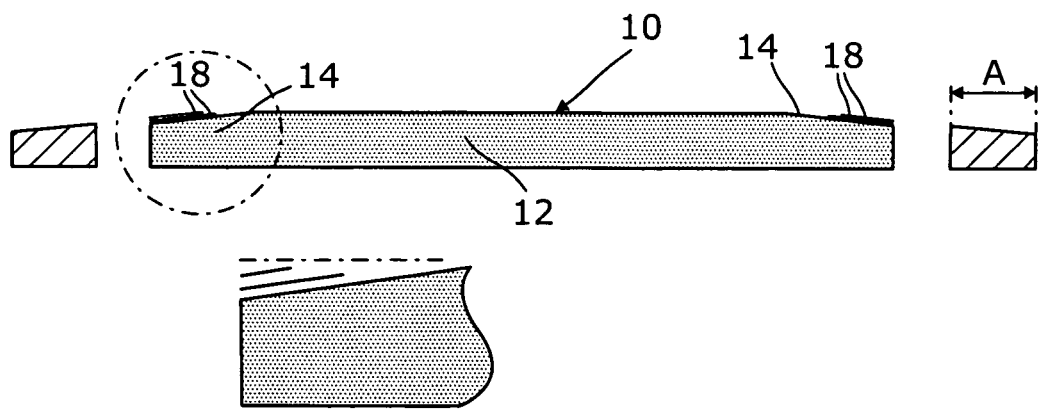
FIG. 3 shows a cross section of a part after curing, showing another operating procedure of the prior art.
Figure 4:
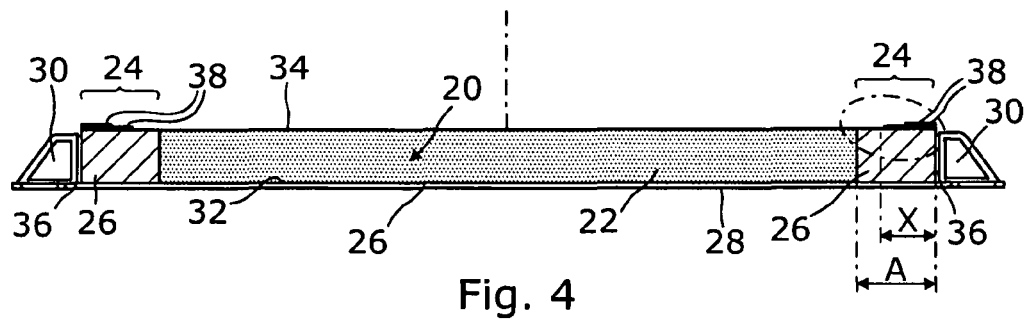
FIG. 4 shows a cross section of a part before curing according to the invention.
Figure 5:
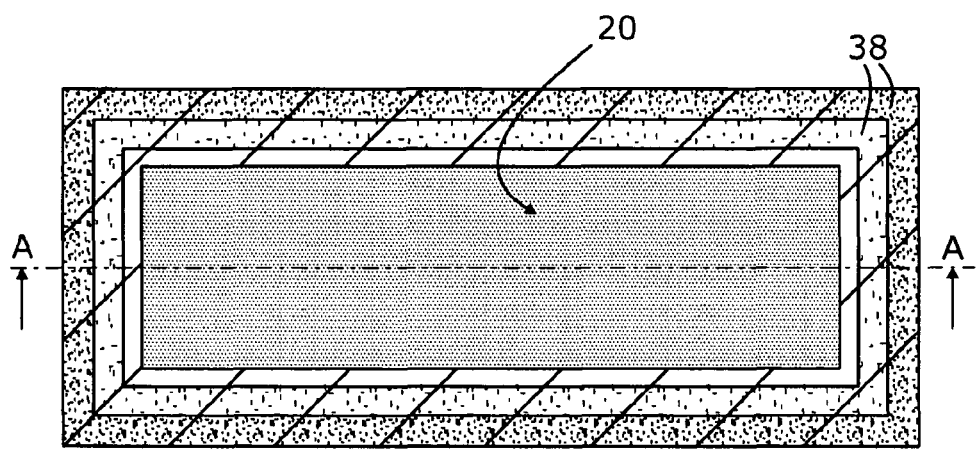
FIG. 5 is a plan view of a part before curing according to the invention.
Figure 6:
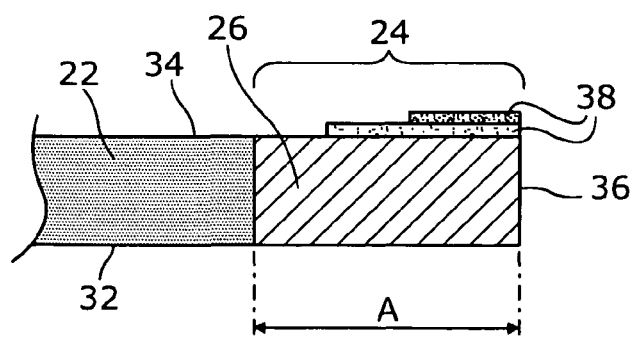
FIG. 6 shows a cross section showing details of an edge of a part before curing according to the invention.

FIG. 4 shows a part 20 made of a composite comprising fibres embedded in a resin matrix. The part comprises a plurality of fibre plies stacked upon one another. For example, the fibres are carbon fibres. However, the invention is not limited to this material and covers all materials usable for fibres, all resins and the various fibre arrangements.

Preferably, the fibres of the plies are prepregs. However, unimpregnated fibres are feasible, the resin being introduced by all suitable means, for example in the form of films (solids) or in liquid or paste form.

To simplify the description, the invention is applied to provide a finished part with a substantially rectangular cross section. However, the invention is not limited to this example. Thus, the part could have an anglular shape or any other shape.

In general, the part 20 comprises a portion 22 which is called body below, and a portion which is called edge 24. In general, the edge 24 extends on the entire periphery of the part.

The part obtained after curing is called a blank and comprises at least one dimension that is equal to or greater than that of the finished part. Thus, the blank comprises a zone 26 to be removed at the edge, in particular by machining. In the various figures, the finished part is shown in grey, while the zone 26 to be removed is shown cross-hatched.

Advantageously, the width X of the zone 26 must be as low as possible (ideally, it should tend towards zero). It is determined by a person skilled in the art in order to take account in particular of the fluctuations and geometric and dimensional inaccuracies caused by the curing process.

In a first production phase according to the prior art, the fibres are placed in a mould comprising, on the one hand, a support surface 28 for shaping the surface of the part at its contact and, the other hand, at least one peripheral edge pad 30.

Thus, the part 20 comprises a bottom surface 32 shaped by the support surface 28, a top surface 34 and sides 36 at the periphery, shaped by the edge pad(s) 30.

By experience, a person skilled in the art knows that theoretically, an edge effect is liable to appear at the edge 24 and that the thickness of the part 20 will tend to decrease at the edge 24 of the body 22 towards the side 36.

Depending in particular on the thickness and the materials employed to produce the part, a person skilled in the art can evaluate the width A presumed to be theoretically impacted at the edge 24. This width A may be greater than the width X of the zone 26 to be removed.

Figure 8:
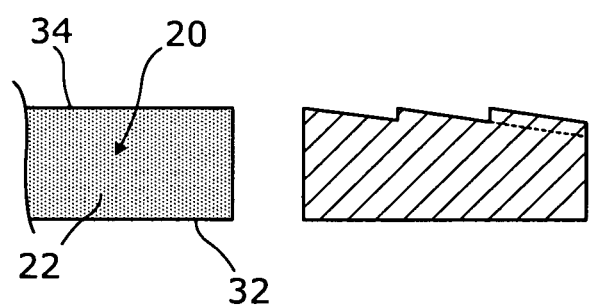
FIG. 8 shows a cross section of a part after machining according to the invention.

According to the invention, prior to the curing of the part, at least one additional ply 38 is placed on the surface of the edge 24 of the part liable to display an edge effect. This arrangement serves to compensate for the migration of the resin during curing and to limit or even to eliminate the edge effects on the finished part, as shown in FIG. 8.

Advantageously, a plurality of additional plies 38 are superimposed upon one another. The number of plies is adjusted according to the thickness and the material used.

According to one embodiment, the additional plies 38 comprise fibres of the same type as those of the rest of the part. Advantageously, the fibres of the additional plies 38 are prepregs with the same resin as the other fibres of the rest of the part.

Preferably, the additional ply (plies) is (are) each in the form of a band, bounded by two lateral sides, having a length adapted to that of the edge, and which have a width smaller than the width X of the zone 26 to be removed, so that each additional ply is positioned in line with the zone 26 to be removed at a distance from the boundary between the finished part and the zone 26 to be removed.

Advantageously, the additional plies 38 are deposited on the surface of the edge 24 using a technique called "ply release", the sides of the plies positioned at the side of the part being substantially superimposed, whereas the sides of the plies oriented towards the body 22 are offset so as to form steps. Thus, if the ply n is covered by a ply n+1 which is itself covered by a ply n+2, since the ply n is the closest to the surface of the part before lay-up of the additional plies, the width of the ply n is greater than the width of the ply n+1 which is itself greater than that of the ply n+2. This arrangement contributes to limiting the risks of crimping of the plies.

The peripheral edge may comprise a plurality of additional plies positioned end to end or slightly overlapping according to the geometry of the said edge in particular.

After the deposition of the additional plies at the edge or edges, the assembly comprising the part 20 and the additional plies 38 is cured. The curing cycle or cycles are not described in detail because they are known to a person skilled in the art and may be identical to those of the prior art.

Figure 7:
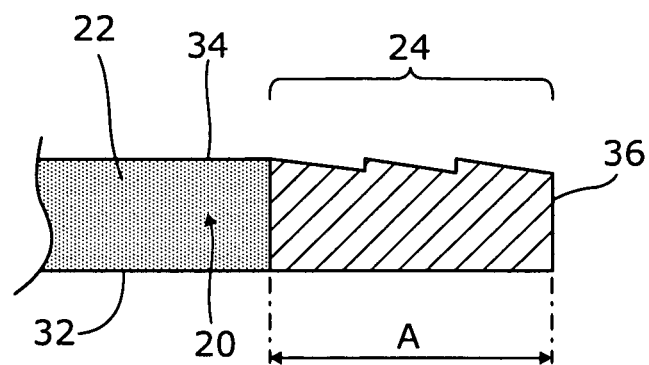
FIG. 7 shows a cross section of a part after curing according to the invention.

After curing and ejection, a monolithic part is obtained as shown in FIG. 7.

After the phases of inspection and removal of the zones 26, a finished part is obtained as shown in FIG. 8, the structure of which is not altered by the addition of the additional plies insofar as they are cured at the same time as the rest of the part. According to another point, this addition of additional plies has no impact at the dimensional or geometric level insofar as the said plies 38 have a smaller width than the removed zone 26. This aspect serves to dispense with the derogation operating procedures.

Finally, this novel method combines the advantages of the prior art methods while eliminating their drawbacks insofar as it tends to optimize the quantity of material to be removed after curing, like the second operating procedure of the prior art, and tends to significantly shorten the production cycle time in comparison with the first operating procedure of the prior art.

The invention claimed is:

1. A blank made of composite material comprised of a plurality of plies, the blank comprising:
    a body; and
    an edge, wherein the edge comprises a zone to be removed and said zone includes at least one additional ply, said additional ply having a width smaller than a width of the zone to be removed.

2. The blank according to claim 1, wherein the at least one additional ply is only present on the zone to be removed.

3. The blank according to claim 1, wherein said at least one additional ply includes a plurality of plies, each ply within the at least one additional ply has a smaller width than an underlying ply.

4. The blank according to claim 2, wherein each ply within the at least one additional ply has a smaller width than an underlying ply.

5. A blank including an edge zone to be removed to make a desired part, said blank comprising:
    a plurality of fiber layers embedded in a cured resin matrix, said blank having a desired thickness, and
    said edge zone including at least one fiber layer in additional to said plurality of fiber layers, wherein said at least one additional fiber layer partially covers said edge zone to be removed and has a smaller width than the width of the edge zone to be removed.

6. The blank according to claim 5, wherein said at least one additional fiber layer is not present on the part once the edge zone has been removed.

7. The blank according to claim 6, wherein the at least one additional fiber layer comprises more than one layer where each layer has a smaller width than an underlying layer.

\* \* \* \* \*